Sept. 10, 1940. E. L. WOODLEY 2,214,360
BAIT
Filed Nov. 7, 1939

Edward Leonidas Woodley
INVENTOR.

Patented Sept. 10, 1940

2,214,360

UNITED STATES PATENT OFFICE

2,214,360

BAIT

Edward Leonidas Woodley, Baird, Tex., assignor of one-half to James Monroe Woodley, Cotton Valley, La.

Application November 7, 1939, Serial No. 303,220

2 Claims. (Cl. 43—39)

This invention relates to improvements in a bait, composed of an elastic compressible body and relatively rigid end members, and a combined rigid core and hook structure. The front end of the core protrudes and is combined with an eyelet member. The elastic compressible body has spaced depressions, in which protrude the points of hooks of the combined core and hook structure, but not beyond the surface lines of the body. A method of variation is provided for the combined core and hook structure, for both the floating and submergence of the bait and for its swimming and wriggling motion through water, when drawn or reeled.

One of the improvements of this invention in angling is to provide for the free and unobstructed movement of the bait when submerged or floating through or over aquatic plants, brushwood, floating obstacles or other impediments. The free and unobstructed movement is achieved by having the points of the hooks beneath the main surface lines of the bait. This feature is of great convenience in avoiding entanglements and also diminishes the hazards of losing the bait. It therefore widens the scope for casting the bait into hazardous water that would otherwise be inaccessible if hooks on outside the body.

Another improvement concerns the yielding elastic compressible body of the bait and the arrangement of hooks to penetrate the mouth of a fish or other water creature when it is seized or bitten while being drawn or reeled in water. A strike compresses the bait which increases tension on the angling line which causes the hooks to pierce forcefully and fasten securely the fish or creature seizing the bait.

I attain these objects as illustrated in the accompanying drawing, in which—

Figure 1:
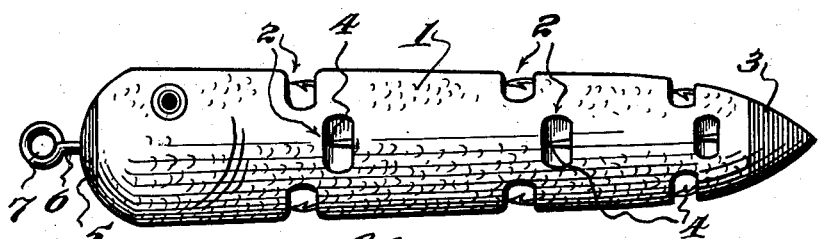
Fig. 1 is a side view of my invention illustrating the general appearance thereof.
Figure 2:
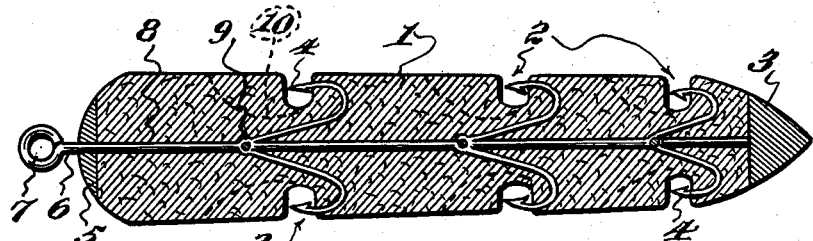
Fig. 2 is a longitudinal section thereof, showing the combined core and hook structure within the body material.
Figure 3:
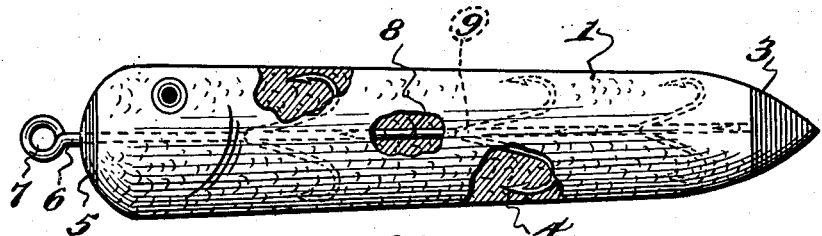
Fig. 3 is a modified form of the body structure eliminating the surface notches or depressions illustrated in Figs. 1 and 2, thereby forming a smooth outer body surface.
Figure 4:
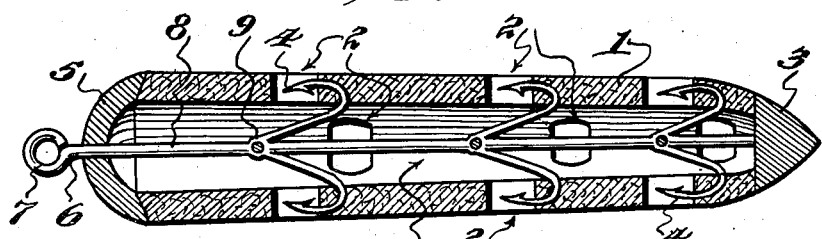
Fig. 4 illustrates a sectional view of a modified form with a hollow surrounding the inner hook structure, designed to further increase the compression of the body structure.

The device consists essentially of an elastic compressible body in combination with a core and hook structure; 1 is an elastic compressible body, 2 is a depressed area in body, 3 is a rear end body member, 4 is point of a hook within a body depression, 5 is a front end body member, 6 is a protruding core member, 7 is a protruding core eyelet member, 8 is a portion of core, 9 is a combined core and hook structure, 10 is a depressed body area, 11 is an interior space.

With the foregoing objects as paramount, the invention has particular reference to its broad usefulness in the construction and arrangement of parts to overcome the principal difficulties that have heretofore attended the use of bait in casting. The principal concealment of the hooks below the main body surface eliminates the hazard of frequent delays, entanglements and the loss of the bait. The unretarded movement and ready manipulation of the bait in water increases its usefulness by having the hooks principally concealed.

It is more enticing, the inducement to bite or strike is increased by concealing the major portion of the hooks. The fish or creature seizing the bait causes instant compression of the elastic compressible body below the level of the points of hooks causing the hooks to penetrate effectually.

The device is highly serviceable. The invention is not limited to specific construction and arrangement of parts as shown and described, and the structure may vary in size and contours and certain other modifications may be resorted to without departing from the essential principle of the invention.

What is claimed is:

1. A bait composed of a body, said body having an elastic intermediate member with depressed areas and relatively rigid end members, and a combined core and hook structure, said structure being within the body, with the exception of a protruding end terminating in an eye, and said structure having the points of the hooks below the external surface of the body.

2. A bait composed of a body, said body having an elastic compressible hollow intermediate member and relatively rigid end members, a core within the body, said core being connected to the rear end member and protruding through the front end member, an eye on said protruding end, and a series of hooks on the core, the points of the hooks being within the contour of the body.

EDWARD LEONIDAS WOODLEY.